(12) United States Patent
Klier et al.

(10) Patent No.: US 10,253,991 B2
(45) Date of Patent: Apr. 9, 2019

(54) IN-LINE HEATED SOLAR THERMAL STORAGE COLLECTOR

(71) Applicant: TIGI LTD., Petah Tikva (IL)

(72) Inventors: Shimon Klier, Savyon (IL); Michael Adel, Zichron Yaakov (IL)

(73) Assignee: TIGI LTD., Petach Tikva (IL)

( * ) Notice: Subject to any disclaimer, the term of this patent is extended or adjusted under 35 U.S.C. 154(b) by 696 days.

(21) Appl. No.: 14/779,976

(22) PCT Filed: Apr. 2, 2014

(86) PCT No.: PCT/IB2014/060376
§ 371 (c)(1),
(2) Date: Sep. 25, 2015

(87) PCT Pub. No.: WO2014/162274
PCT Pub. Date: Oct. 9, 2014

(65) Prior Publication Data
US 2016/0047556 A1 Feb. 18, 2016

Related U.S. Application Data

(60) Provisional application No. 61/807,329, filed on Apr. 2, 2013.

(51) Int. Cl.
*F24D 17/00* (2006.01)
*F24S 10/30* (2018.01)
(Continued)

(52) U.S. Cl.
CPC ..... *F24D 17/0068* (2013.01); *F24D 17/0021* (2013.01); *F24D 19/1006* (2013.01);
(Continued)

(58) Field of Classification Search
CPC ............ F24D 19/1057; F24D 17/0021; F24D 19/1006; F24D 17/0068; F24D 17/0063;
(Continued)

(56) References Cited

U.S. PATENT DOCUMENTS 7,708,010 B2 5/2010 Sweet
8,381,939 B2 2/2013 Schultz et al.
(Continued)

FOREIGN PATENT DOCUMENTS

DE 10212072 10/2003
DE 102008028984 11/2009
(Continued)

*Primary Examiner* — Alfred Basichas
(74) *Attorney, Agent, or Firm* — Mark M. Friedman (57) ABSTRACT

A system for solar assisted water heating provides hot water to a user at a lower cost, higher energy efficiency, and with a quicker response time than conventional systems, reducing energy losses, and improving user comfort. The basic architecture includes four main components: a solar collector, a heat exchanger, an in-line heater, and a control system. A transient heat profile of a first temperature in a primary loop is measured while a first flow generator G1 is active for the primary loop. Solar assisted heating of water in a secondary loop is provided based on: a flow of water in the secondary loop; a current first temperature; and the transient heat profile of the first temperature by activating: the first flow generator in the primary loop and an in-line water heater in the secondary loop.

26 Claims, 4 Drawing Sheets

(51) Int. Cl.
  *F24D 19/10* (2006.01)
  *G05D 23/19* (2006.01)
(52) U.S. Cl.
  CPC .......... *F24D 19/1057* (2013.01); *F24S 10/30* (2018.05); *G05D 23/1924* (2013.01); *F24D 17/0063* (2013.01); *Y02B 10/20* (2013.01); *Y02B 10/70* (2013.01)
(58) Field of Classification Search
  CPC ..... G05D 23/1924; F24S 10/30; Y02B 10/20; Y02B 10/70
  See application file for complete search history.

(56) References Cited

U.S. PATENT DOCUMENTS

2008/0216986 A1  9/2008  Sweet
2013/0047976 A1  2/2013  Kaftori

FOREIGN PATENT DOCUMENTS

| | | |
|---|---|---|
| GB | 2465263 | 5/2010 |
| JP | 03043543 | 2/1991 |
| JP | 2004053228 | 2/2004 |
| JP | 201164649 | 3/2011 |
| RU | 85989 | 8/2009 |

| Inputs | Description | |
|---|---|---|
| VFS(F) | Flow meter of DHW | |
| VFS(T) | DHW temperature (after EH) | |
| S9 | Returning secondary circulation temperature | |
| S8 | DCW temperature (into heat exchanger) | |
| S1 | Primary circulation temperature (into heat exchanger) | |
| S4 | DHW temperature after heat exchange (before EH) | |
| S5 | Ambient temperature | |
| S6 | Primary circulation returning temperature (after heat exchanger) | |
| Outputs | Description | Signal type & range |
| G3 | Primary circulation pump | PWM2 |
| G4 | Secondary circulation pump | On/Off |
| EH 504 | Electric heater of DHW | PID, 0-10v control + 3 phase Triac |

FIGURE 6A

| Parameters | Description | Functions # | Type & Typical Range |
|---|---|---|---|
| T_hot_water | Required temp of DHW – defined by user | 1 | Temperature 40-55°C |
| Pipes_use_temp | Required temp of pipes before expected use | 2 | Temperature °C |
| Tap_time_1 | Pre-set hour for water tapping - 1 | 2 | Time 24h |
| Tap_time_2 | Pre-set hour for water tapping – 2 | 2 | Time 24h |
| Tap_time_3 | Pre-set hour for water tapping - 3 | 2 | Time 24h |
| Data_collect_gap | Time gap between temperature measurement and data collection | 3 | Time 2 hours |
| Meas_length | Period of time of water circulation before saving sensors' readings | 3 | Time 5 min |
| Pre_heat_gap | Time gap before "Tap_time_x" to check status of collector water temperature | 4 | Time 30 min |
| Tank_use_temp | Minimum temperature to ensure user comfort when adding EH | 4 | Temperature 30 - 40°C |
| Showers_number | Requested number of showers | 4 | Integer 1-4 |
| Water_min_temp | Minimal temperature allowed in the collector | 5 | Temperature 0-2°C |
| Ciritical_amb_temp | Low ambient temperature triggering a temporary reduction of data collection time gap. | 5 | Temperature 0-5°C |
| Water_max_temp | Maximal temperature allowed in the collector | 6 | Temperature 100°C |

FIGURE 6B

IN-LINE HEATED SOLAR THERMAL STORAGE COLLECTOR

CROSS-REFERENCE TO RELATED APPLICATIONS

This application claims the benefit of provisional patent application (PPA) Ser. No. 61/807,329, filed Apr. 2, 2013 by the present inventors, which is incorporated by reference.

FIELD OF THE INVENTION

The present invention generally relates to solar thermal heating, and in particular, it concerns improving solar assisted water heating.

BACKGROUND OF THE INVENTION

Figure 1:
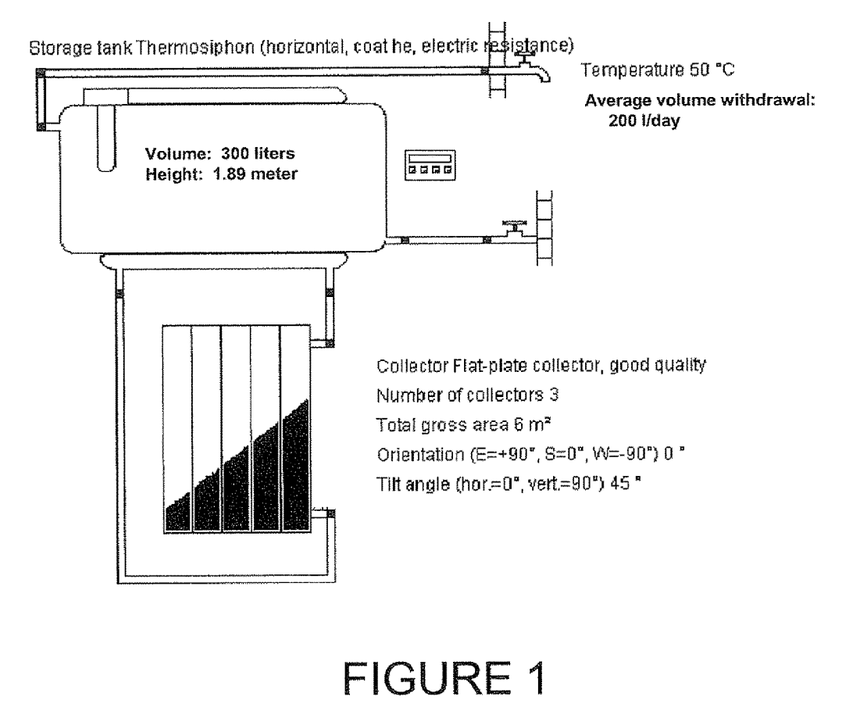
FIG. 1, a diagram of a conventional thermosyphon system.

Conventional domestic hot water storage systems typically combine solar heating and back up heating. One common solar water heating system architecture is known as the thermosyphon system, shown in FIG. 1, a diagram of a conventional thermosyphon system. The thermosyphon system, although cost effective and usable in temperate and warm climates, tends to suffer from clogging due to scale and corrosion. This system is energetically inefficient in cold climates due to the need to heat the outdoor tank to the required domestic hot water (DHW) temperature (65 degrees Celsius [° C.] in many cases in order to prevent risk of Legionnaire's disease) and heat losses due to reverse thermo siphoning during colder periods, such as at night.

Figure 2:
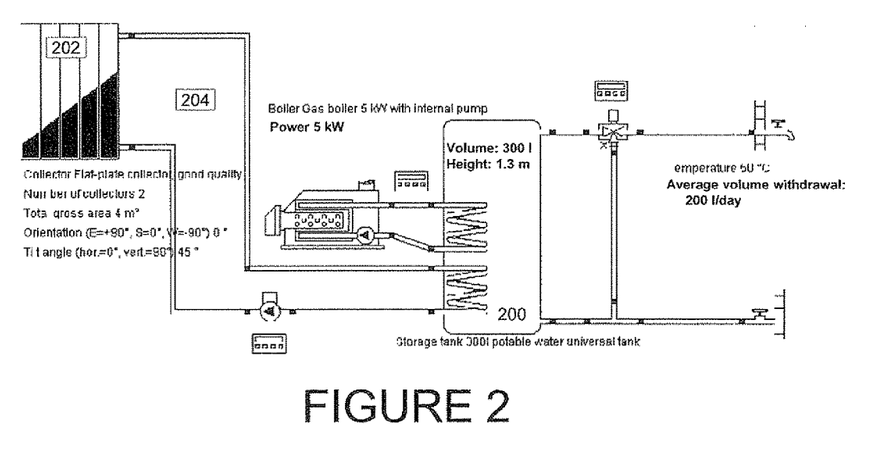
FIG. 2, a diagram of a conventional combi-system.

Refer to FIG. 2, a diagram of a conventional combi-system, an alternative to the thermosyphon system and more common in colder climates. The combi-system separates the tank 200 from the collector 202 allowing the tank 200 to be placed inside (a dwelling). This configuration somewhat reduces heat losses in cold climates but still requires the heating of the full tank as in the above-described thermosyphon system. Since the external collector loop 204 is exposed to potentially freezing temperatures, this loop is generally filled with glycol. In this case, regulations in many European countries require an additional heat exchanger stage (not shown) to prevent risk of contamination of potable water. This regulation further reduces energy efficiency.

Figure 3:
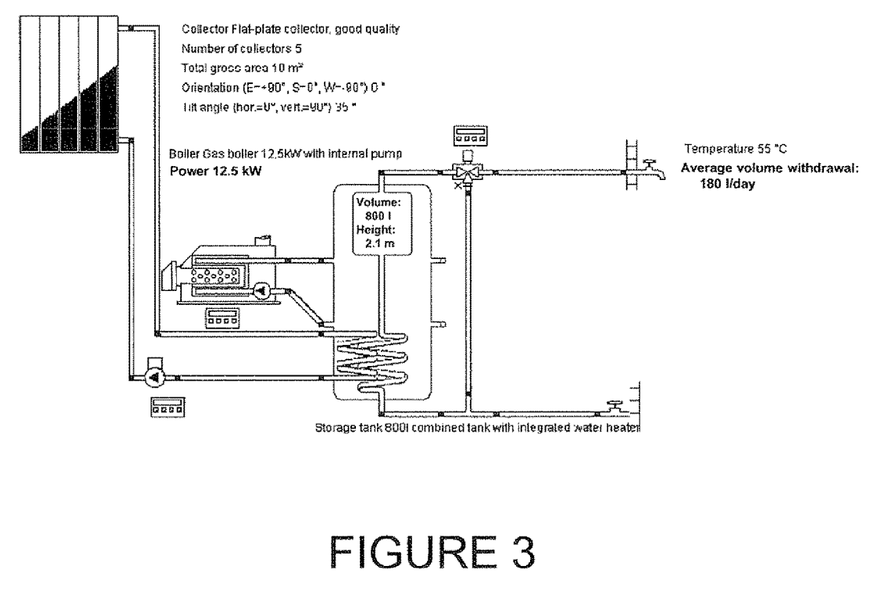
FIG. 3, a diagram of an alternative conventional combi-system.

Refer to FIG. 3, a diagram of an alternative conventional combi-system. This alternative combi-system is an improvement on the above-described combi-system (of FIG. 2). This improved system overcomes the regulatory requirement with the tank-in-a-tank architecture but substantially increases cost.

Most of the above conventional systems also suffer from relative slow response time and fluctuating temperatures when the consumer opens the hot water tap, unless an additional flow generator and flow loop is included in the hot water system, further increasing system cost. A further risk factor for solar water heating systems is that of pipe and collector freezing. A common solution to this problem is the use of glycol or other anti-freeze agents in the solar heat transfer loop. This common solution is costly, requires periodic replacement of the glycol, a drain-back system, and an overheating prevention device to safeguard against damage to the glycol as well as regulatory system complications as specified above.

There is therefore a need for an improved system for solar assisted water heating, having lower cost, higher energy efficiency, and quicker response time than conventional solutions.

SUMMARY

According to the teachings of the present embodiment there is provided a system for solar assisted water heating including:
  a primary loop;
  a first temperature sensor operationally connected to the primary loop and configured to measure a first temperature;
  a first flow generator configured to produce a flow in the primary loop;
  a first flow sensor operationally connected to the primary loop and configured to measure a flow of a heat transfer fluid;
  a heat exchanger operationally connected to the primary loop and a secondary loop;
  an in-line water heater having an input and an output, operationally connected to the secondary loop;
  a system controller configured for:
    measuring a transient heat profile of the first temperature in the primary loop while the first flow generator is active;
    providing solar assisted heating of water in the secondary loop based on:
      a flow of water in the secondary loop;
      a current first temperature; and
      the transient heat profile of the first temperature,
    by activating:
      the first flow generator in the primary loop; and
      an in-line water heater in the secondary loop.
In an optional embodiment,
the primary loop further includes a solar collector including an input and an output;
the in-line heater's output is operationally connected to a hot water output;
the heat exchanger includes:
  a primary loop output;
  a primary loop input operationally connected to the solar collector output;
  a secondary loop input operationally connected to a cold water supply; and
  a secondary loop output operationally connected to the in-line heater input;
thereby defining the secondary loop from the cold water supply to the heat exchanger secondary loop input and from the heat exchanger secondary loop output via the in-line heater to the hot water output;
the first temperature sensor is connected to the solar collector output;
the first flow generator:
  including an input operationally connected to the heat exchanger primary loop output;
  including an output operationally connected to the solar collector input; and
  configured such that upon being activated produces a flow of a heat transfer fluid in the primary loop from the solar collector output to the heat exchanger primary loop input and from the heat exchanger primary loop output via the first flow generator to the solar collector input;

a second flow sensor operationally connected to the secondary loop and configured to measure a flow of water in the secondary loop;
wherein the first flow generator is active at a designated time for a designated time period.

In another optional embodiment, the solar collector is an integrated solar thermal storage collector (ISC). In another optional embodiment, the ISC is transparently insulated. In another optional embodiment, the heat transfer fluid in the primary loop is water. In another optional embodiment, the secondary loop provides potable domestic hot water. In another optional embodiment, the first flow generator is a variable flow generators. In another optional embodiment, the system controller is a proportional integral derivative (PID) controller.

According to the teachings of the present embodiment there is provided a method for solar assisted water heating including the steps of:
measuring a transient heat profile of a first temperature in a primary loop while a first flow generator is active for the primary loop;
providing solar assisted heating of water in a secondary loop based on:
a flow of water in the secondary loop;
a current first temperature; and
the transient heat profile of the first temperature,
by activating:
the first flow generator in the primary loop; and
an in-line water heater in the secondary loop.
An optional embodiment further includes the steps of:
measuring the first temperature in a system including:
a solar collector including an input and an output;
the in-line heater having an input and an output, the output operationally connected to a hot water output;
a heat exchanger including:
a primary loop output;
a primary loop input operationally connected to the solar collector output;
a secondary loop input operationally connected to a cold water supply; and
a secondary loop output operationally connected to the in-line heater input;
thereby defining the secondary loop from the cold water supply to the heat exchanger secondary loop input and from the heat exchanger secondary loop output via the in-line heater to the hot water output;
a first temperature sensor operationally connected to the solar collector output;
the first flow generator:
including an input operationally connected to the heat exchanger primary loop output;
including an output operationally connected to the solar collector input; and
configured such that upon being activated produces a flow of a heat transfer fluid in the primary loop from the solar collector output to the heat exchanger primary loop input and from the heat exchanger primary loop output via the first flow generator to the solar collector input;
a first flow sensor operationally connected to the primary loop and configured to measure a flow of the heat transfer fluid;
a second flow sensor operationally connected to the secondary loop and configured to measure a flow of water in the secondary loop;
wherein the first temperature is measured by the first temperature sensor;
activating the first flow generator at a designated time for a designated time period;
measuring the transient heat profile of the first temperature by the first temperature sensor while the first flow generator is active;
providing solar assisted heating of water in the secondary loop to the hot water output based on:
the flow of water in the secondary loop;
a current first temperature; and
the transient heat profile of the first temperature,
by activating:
the first flow generator; and
the in-line water heater.

In another optional embodiment, the activating is at a designated time selected from the group consisting of:
a periodic time;
every 60 minutes;
a pre-defined time;
based on evaluation of system measurements;
based on machine learning algorithms applied to the transient thermal response profiles to improve the response profile prediction;
based on a profile of flow of water in the secondary loop; and
based on evaluation of hot water output corresponding to use of hot water by system users.

In another optional embodiment, the system further includes: a fifth temperature sensor operationally connected to the hot water output and configured to measure a fifth temperature, and the step of providing is further based on the fifth temperature such that the hot water output is at a pre-defined output temperature.

In another optional embodiment, the system further includes: a second flow generator:
including an input operationally connected to the hot water output;
including an output operationally connected to the cold water supply; and
configured such that upon being activated produces a flow of water in the secondary loop, and
the step of activating further includes activating the second flow generator at the designated time for a designated time period.

In another optional embodiment, the system further includes a fourth temperature sensor operationally connected to the heat exchanger secondary loop output and configured to measure a fourth temperature, and the step of providing is further based on a transient thermal response profile of the fourth temperature.

In another optional embodiment, the second flow sensor measures a lack of flow, further including the step of activating the first flow generator and the second flow generator until the fifth temperature sensor measures the pre-defined output temperature.

In another optional embodiment, the second flow sensor measures a lack of flow, further including the step of activating the first flow generator and the second flow generator until the first temperature sensor measures a pre-defined tank use temperature.

Another optional embodiment further includes the step of activating the first flow generator and/or the second flow generator until pre-designated system parameters have been collected.

In another optional embodiment, the system further includes an ambient temperature sensor configured to measure an ambient temperature, and further including a step of based on the ambient temperature activating the first flow generator, the second flow generator, and the in-line heater, thereby transferring heat from the secondary loop to the primary loop increasing a temperature of the heat transfer fluid.

Another optional embodiment further includes the step of based on the first temperature activating the first flow generator, thereby transferring heat from the primary loop to the secondary loop decreasing a temperature of the heat transfer fluid and preventing overheating of the solar collector.

Another optional embodiment further includes the step of based on the first temperature activating the first flow generator and the second flow generator, thereby transferring heat from the primary loop to the secondary loop decreasing a temperature of the heat transfer fluid and preventing overheating of the solar collector.

According to the teachings of the present embodiment there is provided a system controller configured to implement any of the features of the current description.

According to the teachings of the present embodiment there is provided a computer-readable storage medium having embedded thereon computer-readable code for solar assisted water heating, the computer-readable code including program code for:
measuring a transient heat profile of a first temperature in a primary loop while a first flow generator is active for the primary loop;
providing solar assisted heating of water in a secondary loop based on:
a flow of water in the secondary loop;
a current first temperature; and
the transient heat profile of the first temperature,
by activating:
the first flow generator in the primary loop; and
an in-line water heater in the secondary loop.

According to the teachings of the present embodiment there is provided a computer program that can be loaded onto a server connected through a network to a client computer, so that the server running the computer program constitutes a system controller in a system according to any feature of the current description.

According to the teachings of the present embodiment there is provided a computer program that can be loaded onto a computer connected through a network to a server, so that the computer running the computer program constitutes a system controller in a system according to any feature of the current description.

BRIEF DESCRIPTION OF FIGURES

The embodiment is herein described, by way of example only, with reference to the accompanying drawings, wherein:

FIG. 6A, a table describing the inputs and outputs of the alternate embodiment.

FIG. 6B, a table describing alternate embodiment system parameters with exemplary functions, types, and ranges.

DETAILED DESCRIPTION—FIGS. 1-6B

The principles and operation of the system according to a present embodiment may be better understood with reference to the drawings and the accompanying description. A present invention is a system for solar assisted water heating. The system facilitates providing hot water to a user at a lower cost, higher energy efficiency, and with a quicker response time, as compared to conventional systems, reducing energy losses and improving user comfort.

The innovative basic architecture includes four main components:
a solar collector,
a heat exchanger,
an in-line heater, and
a control system.

These four main components are used both individually and in various conventional solutions, however, the current embodiment is an innovative combination providing solutions to long-standing needs in the field of solar assisted water heating. Features of the current embodiment as compared to conventional solutions include:
Prevention of risk of Legionella by separation of primary and secondary loops.
No freezing due to implementation of freeze prevention sequence.
No overheating due to volume heat capacity of an integrated storage collector.
No glycol required in primary or secondary loops.
No scale or corrosion due to closed primary loop.
Fast temperature response time due to predictive control loop.
Reduced pump energy consumption.
Low initial cost
Reduced cellar space
DHW temperature comfort and stability at fluctuating flows.

While any solar collector can be used in the current embodiment, (for example, a "regular"/flat-panel collector) the system will be described using a preferred embodiment where the solar collector is an integrated solar thermal storage collector (ISC). ISCs are known in the art, and typical ISC implementation includes an integrated heat storage module. One skilled in the art will realize that other implementations are possible, for example a heat storage module in another location in the primary loop or secondary loop. In another preferred embodiment, the ISC includes using transparent insulation, so as to reduce radiative, convective, and conductive heat loss to the environment. An example of a transparent insulated solar thermal storage collector is shown in US patent application #US2010000143201 that is included by reference in its entirety. While this embodiment can be used to heat fluids for a variety of applications, in the current description a preferred implementation of providing domestic hot water (DHW) is used. For clarity in the current description, water will be used as the heat transfer fluid in the primary loop between the ISC and heat exchanger.

Figure 4:
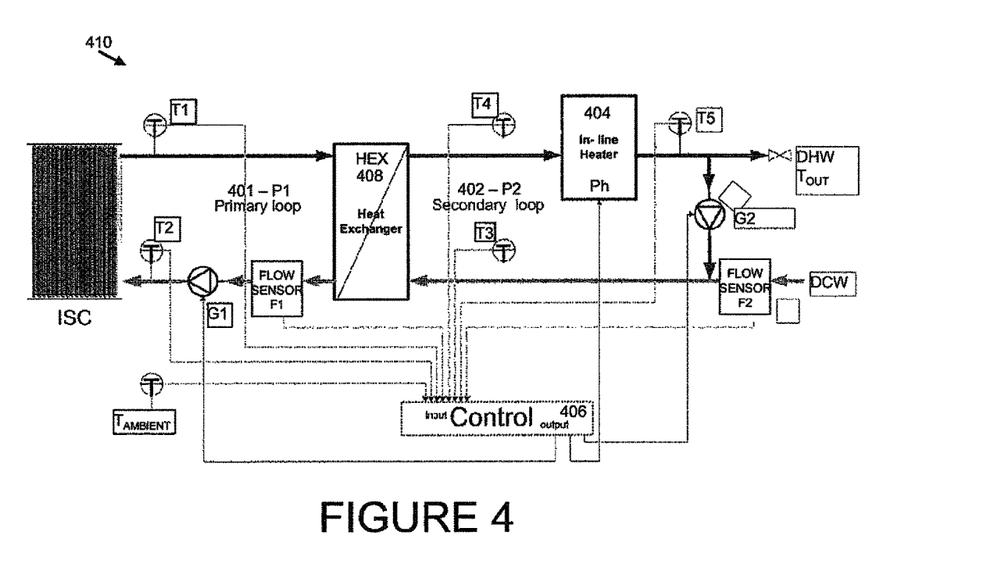
FIG. 4, an exemplary diagram of a system for solar assisted water heating.

Referring now to the drawings, FIG. 4 is an exemplary diagram of a system 400 for solar assisted water heating. Thicker lines represent flow of water and/or heat transfer fluid, while thinner lines are data input/output flow connections. Domestic cold water (DCW) is input to a secondary loop 402 of the system 400. Input flow of DCW is measured by an input flow sensor F2 and temperature of input DCW is measured by DCW input temperature sensor T3. A heat exchanger HEX 408 transfers heat between incoming DCW in the secondary loop 402 and primary loop 401. Heat exchangers are known in the art and available from commercial sources. Based on the current description, one skilled in the art will be able to select an appropriate heat exchanger for a specific implementation. Output temperature of water from the HEX to the secondary loop 402 is measured by fourth temperature sensor T4. An in-line heater 404 can be used to heat water from the HEX for domestic hot water (DHW). A DHW temperature sensor T5 measures the temperature of water from the in-line heater 404 to be supplied as DHW. The actual temperature of supplied DHW is designated as output temperature $T_{out}$. Typically, the desired and/or required domestic hot water (DHW) temperature (T_hot_water) is pre-determined, such as 55° C. In the primary loop 401, flow of a heat transfer fluid (which in this exemplary description is water) is measured by primary loop flow sensor F1. A second temperature sensor measures the temperature of water in the primary loop 401 from the HEX entering the ISC. A first temperature sensor T1 measures the temperature of water in the primary loop 401 exiting the ISC to flow into the HEX, which generally corresponds to water temperature in the ISC. The ambient temperature of the environment of the ISC is measured by temperature sensor $T_{ambient}$. Primary loop flow generator G1 can be implemented between flow sensor F1 and second temperature sensor T2. Activation of G1 causes the water to flow in the primary loop 401, thus causing heat to flow in the primary loop 401. Similarly, secondary loop flow generator G2 can be implemented from A) between T5 and DHW to B) between F2 and T3. Activation of G2 causes the water to flow in the secondary loop 402, thus causing heat to flow in the secondary loop 402. Preferably, the flow generators are variable flow generators.

A system controller 406 is preferably connected to all of the temperature sensors (T1, T2, T3, T4, T5, $T_{ambient}$), flow generators (G1, G2), and in-line heater (404). System parameters include, but are not limited to any information from a system component, such as temperatures (T1, T2, T3, T4, T5, $T_{ambient}$), flow rates (F1, F2), pre-defined values, values that vary during operation, usage information, and user input. System parameters can also include derived parameters, for example profile values measured dependent on time (t), such as transient heat profiles. Measurement of a lack of flow by a flow sensor indicates that the respective loop for that flow sensor is inactive, in other words heat transfer fluid or water is not flowing and not circulating in the pipes of that loop.

Based on the current description, one skilled in the art will be able to design and deploy an implementation to meet the needs of a specific application, including, but not limited to: adding additional sensors, using less sensors, changing the location of flow generators, adding or using less flow generators, and adding or using less control connections.

Note that in the current description the same notation is used for a sensor and the value of parameters measured by that sensor. For example, DCW input temperature sensor T3 measures the temperature of input DCW, referred to in this description as input temperature T3. The use of a notation for a device or the parameter the device measures will be obvious from the context of use of the notation.

Profiles of values measured are generally dependent on time (t), and use common notation of the form T3(t), where T3(t) is the time-varying value of temperature T3 as measured by DCW input temperature sensor T3.

In the current embodiment, the system controller 406 primarily operates based on amounts of power associated with components of system 400. A power requirement $P_{req}$ for system 400 can be instantaneously calculated by measurement of DCW input temperature T3 and input flow rate F2. Given a known temperature requirement of the DHW (for example $T_{out}$=65° C.), the power requirement $P_{req}$ can be determined by:

$$P_{req} = C_v F_2 (T_{out} - T_3),$$

where $C_v$ is the volume heat capacity of water. This power requirement will come primarily from the ISC through the primary loop 401 and is supplemented as needed by the in-line heater 404, such that $P_{req}$ is the sum of $P_2$, the power in the secondary loop 402 and $P_h$, the in-line heater 404 power, that is:

$$P_{req} = P_2 + P_h$$

When the DHW tap is opened, input flow F2 is detected by input flow sensor F2, and thus system controller 406. A signal is sent from system controller 406 to primary loop flow generator G1. The power $P_2$ in the secondary loop 402 is determined by:

$$P_2 = C_v F_2 (T_4 - T_3).$$

If the first temperature T1 and second temperature T2 are measured arbitrarily close to the heat exchanger HEX, then the power $P_2$ generated in the secondary loop 402, is assumed to be equal to the power $P_1$ in the primary loop 401, that is:

$$P_1 = P_2.$$

Hence, the power $P_h$ required by the in-line heater 404 can be determined from the equation:

$$P_h = \begin{cases} 0 & P_1 \geq P_{req} \\ C_v F_2 (T_{out} - T_4) & P_1 < P_{req} \end{cases}$$

In the steady state, the above-described operation of the system enables the in-line heater power $P_h$ to be determined. In a first case, i.e. when the ISC water temperature is high enough, the required primary loop flow F1 can be determined by equating the powers in the two loops (P1 in primary loop 400 and P2 in secondary loop 402):

$$F_1 = \frac{F_2 (T_{out} - T_3)}{(T_1 - T_2)}$$

Predictive Control Loop

Typical in-line heater control systems rely on temperature feedback from DHW temperature sensors using standard PID (proportional integral derivative) controller logic. However, there is an unavoidable time lag between the signal from a DHW sensor and a response, due to the finite volume and temperature uncertainty of water in the pipelines and heat exchanger, as well as an unknown temperature, i.e. heat capacity, stored in the solar collector. Hence, there is a need for predictive control to improve the performance of conventional solar assisted water heating systems.

In practice, although $T_{out}$ is set constant and temperature T3 varies only slowly over a day or a season, temperatures T1 and T2 can vary rapidly and depend on the amount of energy currently stored in the solar collector/heat storage module. An embodiment of a system implementing predictive control for solar assisted water heating features periodic activation of the primary loop 401. Periodically, for example every 60 minutes, the primary loop flow generator G1 can be activated by the system controller 406 in a predictive controller event causing heat to flow in the HEX for a short period. The short period can be pre-defined, or calculated for each periodic activation of G1 based on system parameters. The periodic activation can allow two parameters to be measured and updated in the system controller 406: 1) The water temperature in the storage collector, (corresponding to T1, as described above) and the rate at which T1 temperature changes with time when the primary loop flow F1 is switched on (that is, primary loop flow generator G1 is activated). These two parameters can be used to control the in-line heater transient heat profile from $P_h(t)$ and the primary loop flow $F_1(t)$ in the primary loop 401 when the DHW tap is opened and flow is detected in input flow sensor F2. This event also enables updating of the transient heat profile $P_h(t)$ at times between the periodically generated flow events (periodic activation of the primary loop 401).

In an alternative embodiment, predictive control can be applied to the secondary loop 402. In this case, periodically, for example every 60 minutes, both flow generators G1 and G2 are activated, allowing all system parameters to be measured and updated in the system controller 406. Updating includes updating the steady state water temperature in the primary loop 401 (that is, temperature T1), the steady state water temperature in the secondary loop 402 (that is, temperature T4), and the rate at which temperature T4 rises with time when the flow is switched on, termed the transient thermal response profile $T4(t)$. The updated parameters can be used by system controller 406 to control the transient heat profile from $P_h(t)$ and/or $F1(t)$ when the DHW tap is opened and flow is detected in input flow sensor F2. A possible improvement to this alternative embodiment is the use of machine learning algorithms such as genetic or neural network algorithms that monitor the transient thermal response profiles over time and improve the response profile prediction. This enables the in-line heater power $P_h$ to be set without waiting for a response from DHW temperature sensor T5, and only when temperature T5 stabilizes at $T_{out}$, can $P_h$ revert to system controller 406 control activated by sensor T5.

Pre-Heat Function

In order to minimize the wait time between the moment the DHW tap is opened and the time when hot water is available to the user, the current embodiment can further include a pre-heat function. This pre-heat function is enabled by operating primary loop flow generator G1 and then a short time later (the short time based on the predicted transient thermal response profile $T4(t)$) operating secondary loop flow generator G2 to produce flow in the secondary loop 402. Alternatively, simultaneous with operation of primary loop flow generator G1 operating secondary loop flow generator G2. This pre-heat function can also be thermostat based on either T5 or T1, such that during preset hours the pre-heat function is operated when the temperature goes below a set point. Alternately, the pre-heat function can be activated by an external signal such as a light switch in a bathroom, etc.

Freeze Prevention Function

The current embodiment can additionally or alternatively include a freeze prevention function, preventing freezing of the ISC or the piping in the primary (external) loop 401 or secondary loop 402. In this case, monitored temperatures include the ambient temperature $T_{ambient}$, or alternately temperature T1. When one of the monitored temperatures goes below a specified set point, the system 400 is operated in reverse. Reverse operation of system 400 is enabled by operating the in-line heater 404, flow generator G1 in the primary loop 401 and flow generator G2 in the secondary loop 402 to produce flow in the secondary loop 402. Heat exchanger HEX operates in reverse, pushing warm water, heated by the in-line heater 404 into the ISC and preventing freezing of water (heat exchange fluid) in the primary loop 401. An alternative indicator to activate the freeze prevention function (mode of operation) can be that the temperature in the ISC (as determined by the predictive controller event) goes below a predetermined set point. This freeze prevention function enables the use of water, in particular only water, and not water/glycol in the primary loop 401, thereby enabling operation of the primary loop without antifreeze fluids.

In general, an implementation of the current embodiment of a system for solar assisted water heating includes a primary loop and a secondary loop. The primary loop includes:
- a first temperature sensor operationally connected to the primary loop and configured to measure a first temperature;
- a first flow generator configured to produce a flow in the primary loop; and
- a first flow sensor operationally connected to the primary loop and configured to measure a flow of a heat transfer fluid.

A heat exchanger is operationally connected to the primary loop and the secondary loop. The secondary loop includes an in-line water heater having an input and an output. A system controller is configured for:
measuring a transient heat profile of the first temperature in the primary loop while the first flow generator is active;
providing solar assisted heating of water in the secondary loop based on:
a flow of water in the secondary loop; a current first temperature; and the transient heat profile of the first temperature,
by activating:
the first flow generator in the primary loop; and an in-line water heater in the secondary loop.

ALTERNATE AND EXEMPLARY EMBODIMENT

Figure 5:
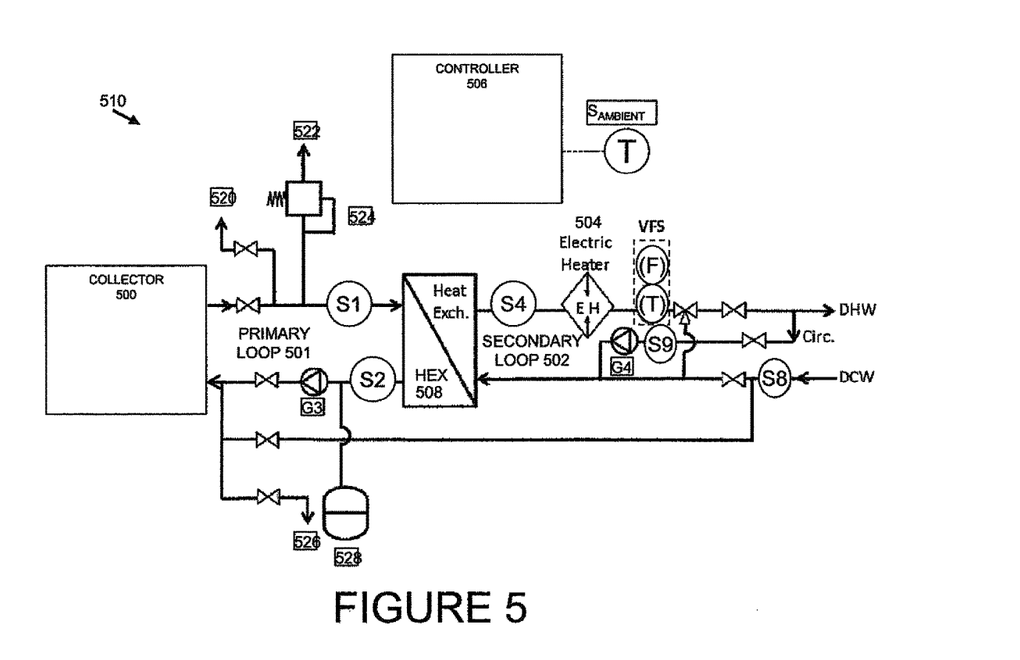
FIG. 5, an alternate and exemplary embodiment of FIG. 4.

Refer now to FIG. 5, an alternate and exemplary embodiment of the above-described embodiment of FIG. 4. In addition to the four main components of the basic system, the current embodiment 501 features three main subsystems:
a solar collector, preferably transparent-insulation based. The collector includes an exemplary ~300-liter non-pressurized storage tank with 4.6 m² of collecting area. This collector does not include any temperature sensors or heating elements, allowing use of a collector lacking sensors and/or active elements. The water in the storage tank is in closed circulation with a fresh water module (FWM) using tap water or water/glycol mixture.
a fresh water module (FWM) including a HEX 508, an in-line electric heater 504, a primary circulation pump G3 (preferably high efficiency, speed controlled), a secondary circulation pump G4, a variable flow sensor (VFS) unit, dry wells for sensors at all sensor locations, an expansion vessel 528, a pressure reducer 522, and mixing module component (not shown), shut-off valves (not shown), safety valves (including pressure reducer 522, 524), air release 520 (also used for overheat protection), and drain valve 526.

a control system 506.

The current embodiment utilizes the accumulated solar energy (from the collector unit) whenever possible, and supplements the additional required heat by the in-line electric heater 504 in order to achieve optimal user comfort. The control system 506 is designed to maintain optimal user comfort and efficient energy utilization, and to provide reliability and safety of the entire system. In addition, the system will display user-friendly data, and will allow remote control and access. For clarity, connections from system controller 506 to sensors and other components are not shown in the current figure.

Most elements of the current figure are comparable to previously described elements, including:

collector 500—ISC
primary loop 501 (also known as "collector cycle")—primary loop 401
secondary loop 502 (also known as "DHW cycle")—secondary loop 402
in-line heater 404—electric heater EH 504
controller 506—system controller 406
heat exchanger HEX 408—heat exchanger HEX 508
$S_{AMBIENT}$-$T_{AMBIENT}$
S1-T1
S2-T2
S4-T4
variable flow sensor (temperature) VFS(T)—T5
third flow generator G3—first flow generator G1
fourth flow generator G4—second flow generator G2

FIG. 5 additionally includes:

A variable flow sensor (flow) VFS(F) similar to the functionality of first flow sensor F1 and second flow sensor F2 but operational to detect flow of DHW.
Temperature sensor S9 operational to measure a temperature of returning secondary circulation.
Temperature sensor S8 operational to measure a temperature of DCW (into heat exchanger).
The above-described fresh water module (FWM) and associated components.

Refer to FIG. 6A, a table describing the inputs and outputs of the current embodiment, and FIG. 6B, a table describing system parameters with exemplary functions, types, and ranges.

The current embodiment can support various functions as implemented by controller 506, including:

1. Normal use:
   a. Electric heating supported
   b. Unsupported (only solar heating)
   c. Only electric heating (no solar heating)
2. Circulation towards expected use
3. Data collection
4. Tank pre-heating
5. Freezing prevention
6. Over-Heating prevention (OHP):
   a. OHP1 circulation primary loop 501 only
   b. OHP2 extreme—extract water from primary loop 501 and cool by secondary loop 502

Exemplary implementations of functions are now described.

Function 1: "Normal Use"

In the current function, hot water is consumed by the user by opening a water tap (DHW). When water is tapped, hot water from the collector is circulated in order to supply tap water at a required temperature. Electric heating is added as necessary. The trigger, inputs, parameters, and outputs can be summarized as in the following table:

| Trigger | VFS(F) - "On" |
|---|---|
| Inputs | S8, S1, S4, VFS(T), VFS(F) |
| Parameters | T_hot_water; $X_s$ seconds (stabilization time) |
| Outputs | G3, EH |

The main pump (third flow generator G3) and the electric heating (electric heater EH 504) are activated with maximum power to allow maximum user comfort of supplied DHW. When VFS(T) temperature reaches T_hot_water, the EH 504 is turned off. When S4 temperature reaches T_hot_water+2 degrees, the main pump (G3) speed is adjusted to maintain temperature S4 (to avoid fluctuating of the EH). The electric heater can be turned back on as necessary. If the temperature S1 of hot water from the collector 500 is colder than DCW (S8) after a pre-determined stabilization time ($X_S$), such as 30 seconds, the main pump G3 will be turned off and only electric heating via EH 504 will be activated as necessary (by PID controller 506).

Function 2: "Circulation Towards Expected Use"

In the current function, the system performs pre-heating by water circulation towards expected water tapping (use of DHW). The water in both loops (primary loop 501 and secondary loop 502) is heated for use in expected (anticipated) water tapping. Heating of water in the loops begins when an external trigger is activated (e.g. turn on of bathroom light) or towards a pre-set time of water tapping, in order to improve user comfort and response time.

The trigger, inputs, parameters, and outputs can be summarized as in the following table:

| Trigger | External trigger (e.g. light on or signal from smart home system) or Pre-set water tapping times (tap_time_x) |
|---|---|
| Inputs | S9, S1, S4, S6, VFS(T) |
| Parameters | Circulation time $X_C$ seconds; tap_time_1; tap_time_2; tap_time_3 |
| Outputs | G3; G4 |

Both pumps (G3 and G4) are activated (primary and secondary circulations) in order to circulate hot water and heat the system. The circulation continues for a pre-determined amount of time ($X_C$ seconds.

Function 3: "Data Collection"

In the current function, data is collected from sensors by circulating water in the primary loop 501 and/or the secondary loop 502. This function can be used in order to prepare the system for expected use, and verify system protection against freezing or over-heating. The temperatures are measured in some and/or all sensors as appropriate, reported to the controller, and saved for data analysis.

The trigger, inputs, parameters, and outputs can be summarized as in the following table:

| Trigger | Data_collect_time |
|---|---|
| Inputs | S9, S1, S4, S5, S6, VFS(T), VFS(F) |

| Parameters | Data_collect_time; X_meas_length |
|---|---|
| Outputs | G3; G4 |

Water circulation in both loops (primary 501 and secondary 502) enables temperature measurement in all sensors (except for DCW S8). Both pumps are activated, preferably at the same speed, for a defined period of time (X_meas_length) for stabilization. The measurements are read and saved in the controller starting from a defined "data collection time" (Data_collect_time) and at subsequent times, such as every 2 hours afterwards (meaning, every 2 hours around the clock).

Based on this data, other functions might be activated, such as freezing prevention, over-heating prevention, and tank pre-heating.

Function 4: "Tank Pre-Heating"

In the current function, reverse heating of the water in the collector's tank is performed towards expected use. Reverse heating of the water in the collector's tank might be necessary in order to be able to reach the required temperature during water tapping.

The trigger, inputs, parameters, and outputs can be summarized as in the following table:

| Trigger | Tap_time_x-Pre_heat_gap |
|---|---|
| Inputs | S1 |
| Parameters | Tap_time_x, Pre_heat_gap, Tank_use_temp, Showers_number |
| Outputs | G3; G4; EH |

The controller can decide to activate reverse heating based information such as on a requested number of showers by users at a pre-set time and on the system's status. In this case, the electric heating and both pumps will be activated, so that the water in the collector will be heated by the water coming from the electric heater, through the heat exchanger. The heating starting time and length will be decided based on the data last saved, and on a time gap between the last measurement and the expected shower time, with the heat transfer fluid in the primary loop heated to a pre-defined tank use temperature (Tank_use_temp).

Function 5: "Freezing Prevention"

In the current function, water is circulated in order to prevent water freezing in the pipes, in particular in the primary loop 501. In order to prevent water freezing in the pipes and blocking of the water circulation, the water must be kept above a minimal temperature (Water_min_temp). When required, based on data collection, the water should be circulated in both loops in order to heat the water and prevent freezing.

The trigger, inputs, parameters, and outputs can be summarized as in the following table:

| Trigger | Data collection/water tapping: Temperatures comparison to Water_min_temp |
|---|---|
| Inputs | S9, S1, S4, S5, S6, VFS(T) |
| Parameters | Water_min_temp; Data_collect_time |
| Outputs | G3; G4; EH |

Based on the temperatures measured during data collection or water tapping, water freezing can be prevented by circulating the water in both loops. Both pumps (G3, G4) will be activated, until the minimum required water temperature (Water_min_temp) is achieved in all temperature sensors. In case ambient temperature is very low, the time gap between data collection measurement can be temporarily reduced (Critical_amb_temp).

Function 6: "Over-Heating Prevention"

In the current function, water is circulated in order to prevent over-heating of the collector. In order to prevent over-heating of the collector, the water in the tank must be kept under a maximum pre-defined temperature (Water_max_temp). When required, based on data collection, the water should be circulated in the primary loop in order to transfer energy to the water in the secondary loop and reduce the heat of the water in the collector. In more severe cases, when this circulation does not reduce the temperature as required (fails to sufficiently reduce the temperature), the second loop is also circulated, while adding cold water (DCW) into the circulation. The water in the primary loop is then cooled through the heat exchanger.

The trigger, inputs, parameters, and outputs can be summarized as in the following table:

| Trigger | Data collection/water tapping: Temperature comparison to Water_max_temp |
|---|---|
| Inputs | S1 |
| Parameters | Water_max_temp |
| Outputs | G3; G4 |

Based on the temperatures measured during data collection or water tapping, over-heating of the collector can be prevented by circulating the water in the primary loop, or in both loops, as necessary. At first, the main pump G3 is activated and water circulation in the primary loop begins. If this action is not enough (insufficient), the water in the secondary loop is also circulated, while adding cold water. The pumps are activated until the maximum allowed water temperature (Water_max_temp) is achieved in the temperature sensor measuring the water coming out of the collector (S1).

Note that a variety of implementations for modules and processing are possible, depending on the application. The above-described module functions can be combined and implemented as fewer modules or separated into sub-functions and implemented as a larger number of modules. Based on the above description, one skilled in the art will be able to design an implementation for a specific application.

Note that the above-described examples, numbers used, and exemplary calculations are to assist in the description of this embodiment. Inadvertent typographical errors, mathematical errors, and/or the use of simplified calculations do not detract from the utility and basic advantages of the invention.

To the extent that the appended claims have been drafted without multiple dependencies, this has been done only to accommodate formal requirements in jurisdictions that do not allow such multiple dependencies. Note that all possible combinations of features that would be implied by rendering the claims multiply dependent are explicitly envisaged and should be considered part of the invention.

It will be appreciated that the above descriptions are intended only to serve as examples, and that many other embodiments are possible within the scope of the present invention as defined in the appended claims.

What is claimed is:

1. A system for solar assisted water heating comprising:
   (a) a primary loop including a solar collector, said solar collector including an input and an output;
   (b) a first temperature sensor operationally connected to said primary loop and configured to measure a first temperature;
   (c) a first flow generator configured to produce a flow in said primary loop;
   (d) a first flow sensor operationally connected to said primary loop and configured to measure a flow of a heat transfer fluid;
   (e) a second flow sensor operationally connected to a secondary loop and configured to measure a flow of water in said secondary loop;
   (f) an in-line heater having an input and an output, operationally connected to said secondary loop;
   (g) a heat exchanger including:
      (i) a primary loop output;
      (ii) a primary loop input operationally connected to said solar collector output;
      (iii) a secondary loop input operationally connected to a cold water supply; and
      (iii) a secondary loop output operationally connected to said in-line heater input; thereby defining said secondary loop from said cold water supply to said heat exchanger secondary loop input and from said heat exchanger secondary loop output via said in-line heater to said hot water output,
   (h) a system controller configured for:
      (i) measuring a transient heat profile of said first temperature in said primary loop while said first flow generator is active;
      (ii) providing solar assisted heating of water in said secondary loop based on:
         (A) said flow of water in said secondary loop;
         (B) a current first temperature; and
         (C) said transient heat profile of said first temperature,
      by activating:
         (i) said first flow generator in said primary loop; and
         (ii) an in-line heater in said secondary loop,
      said transient heat profile being a time dependent measurement of said first temperature.

2. The system of claim 1 wherein:
   said in-line heater's output is operationally connected to a hot water output;
   said first flow generator:
      (i) including an input operationally connected to said heat exchanger primary loop output;
      (ii) including an output operationally connected to said solar collector input; and
      (iii) configured such that upon being activated produces a flow of a heat transfer fluid in said primary loop from said solar collector output to said heat exchanger primary loop input and from said heat exchanger primary loop output via said first flow generator to said solar collector input;
   a second flow sensor operationally connected to said secondary loop and configured to measure a flow of water in said secondary loop;
   wherein said first flow generator is active at a designated time for a designated time period.

3. The system of claim 1 wherein said solar collector is an integrated solar thermal storage collector (ISC).

4. The system of claim 3 wherein said ISC is transparently insulated.

5. The system of claim 1 wherein said heat transfer fluid in said primary loop is water.

6. The system of claim 1 wherein said secondary loop provides potable domestic hot water.

7. The system of claim 1 wherein said first flow generator is a variable flow generators.

8. The system of claim 1 wherein said system controller is a proportional integral derivative (PID) controller.

9. A method for solar assisted water heating comprising the steps of:
   (a) measuring a transient heat profile of a first temperature in a primary loop while a first flow generator is active for said primary loop; said primary loop including a solar collector;
   (b) providing solar assisted heating of water in a secondary loop based on:
      (i) a flow of water in said secondary loop;
      (ii) a current first temperature; and
      (iii) said transient heat profile of said first temperature,
   by activating:
      (i) said first flow generator in said primary loop; and
      (ii) an in-line heater in said secondary loop,
   said transient heat profile being a time dependent measurement of said first temperature.

10. The method of claim 9 further comprising the steps of:
   (a) measuring said first temperature in a system including:
      (i) said solar collector including an input and an output;
      (ii) said in-line heater having an input and an output,
         (A) said output operationally connected to a hot water output;
      (iii) a heat exchanger including:
         (A) a primary loop output;
         (B) a primary loop input operationally connected to said solar collector output;
         (C) a secondary loop input operationally connected to a cold water supply; and
         (D) a secondary loop output operationally connected to said in-line heater input;
   thereby defining said secondary loop from said cold water supply to said heat exchanger secondary loop input and from said heat exchanger secondary loop output via said in-line heater to said hot water output;
      (iv) a first temperature sensor operationally connected to said solar collector output;
      (v) said first flow generator:
         (A) including an input operationally connected to said heat exchanger primary loop output;
         (B) including an output operationally connected to said solar collector input; and
         (C) configured such that upon being activated produces a flow of a heat transfer fluid in said primary loop from said solar collector output to said heat exchanger primary loop input and from said heat exchanger primary loop output via said first flow generator to said solar collector input;
      (vi) a first flow sensor operationally connected to said primary loop and configured to measure a flow of said heat transfer fluid;
      (vii) a second flow sensor operationally connected to said secondary loop and configured to measure a flow of water in said secondary loop;
   wherein said first temperature is measured by said first temperature sensor;
   (b) activating said first flow generator at a designated time for a designated time period;

(c) measuring said transient heat profile of said first temperature by said first temperature sensor while said first flow generator is active;
(d) providing solar assisted heating of water in said secondary loop to said hot water output based on:
  (i) said flow of water in said secondary loop;
  (ii) a current first temperature; and
  (iii) said transient heat profile of said first temperature,
by activating:
  (i) said first flow generator; and
  (ii) said in-line heater.

11. The method of claim 10 wherein said activating is at a designated time selected from the group consisting of:
  (a) a periodic time;
  (b) every 60 minutes;
  (c) a pre-defined time;
  (d) based on evaluation of system measurements;
  (e) based on machine learning algorithms applied to the transient thermal response profiles to improve the response profile prediction;
  (f) based on a profile of flow of water in said secondary loop; and
  (g) based on evaluation of hot water output corresponding to use of hot water by system users.

12. The method of claim 10 wherein said system further includes:
  a fifth temperature sensor operationally connected to said hot water output and configured to measure a fifth temperature, and
  said step of providing is further based on said fifth temperature such that said hot water output is at a pre-defined output temperature.

13. The method of claim 12 wherein said system further includes:
  a second flow generator:
    (i) including an input operationally connected to said hot water output;
    (ii) including an output operationally connected to said cold water supply; and
    (iii) configured such that upon being activated produces a flow of water in said secondary loop, and
    said step of activating further includes activating said second flow generator at said designated time for a designated time period.

14. The method of claim 13 wherein said system further includes:
  a fourth temperature sensor operationally connected to said heat exchanger secondary loop output and configured to measure a fourth temperature, and
  said step of providing is further based on a transient thermal response profile of said fourth temperature.

15. The method of claim 13 wherein said second flow sensor measures a lack of flow, further including the step of:
  activating said first flow generator and said second flow generator until said fifth temperature sensor measures said pre-defined output temperature.

16. The method of claim 13 wherein said second flow sensor measures a lack of flow, further including the step of:
  activating said first flow generator and said second flow generator until said first temperature sensor measures a pre-defined tank use temperature.

17. The method of claim 13 further including the step of:
  activating said first flow generator and/or said second flow generator until pre-designated system parameters have been collected.

18. The method of claim 13 wherein said system further includes:
  an ambient temperature sensor configured to measure an ambient temperature, and
  further including a step of
  based on said ambient temperature activating said first flow generator, said second flow generator, and said in-line heater,
  thereby transferring heat from said secondary loop to said primary loop increasing a temperature of said heat transfer fluid.

19. The method of claim 10 further including a step of
  based on said first temperature activating said first flow generator,
  thereby transferring heat from said primary loop to said secondary loop decreasing a temperature of said heat transfer fluid and preventing overheating of said solar collector.

20. The method of claim 13 further including a step of
  based on said first temperature activating said first flow generator and said second flow generator,
  thereby transferring heat from said primary loop to said secondary loop decreasing a temperature of said heat transfer fluid and preventing overheating of said solar collector.

21. A system controller configured to implement claim 1.

22. A computer-readable storage medium having embedded thereon computer-readable code for solar assisted water heating, the computer-readable code comprising program code for:
  (a) measuring a transient heat profile of a first temperature in a primary loop while a first flow generator is active for said primary loop; said primary loop including a solar collector;
  (b) providing solar assisted heating of water in a secondary loop based on:
    (i) a flow of water in said secondary loop;
    (ii) a current first temperature; and
    (iii) said transient heat profile of said first temperature,
  by activating:
    (i) said first flow generator in said primary loop; and
    (ii) an in-line heater in said secondary loop,
  said transient heat profile being a time dependent measurement of said first temperature.

23. A computer program that can be loaded onto a server connected through a network to a client computer, so that the server running the computer program constitutes a system controller in a system according to claim 1.

24. A computer program that can be loaded onto a computer connected through a network to a server, so that the computer running the computer program constitutes a system controller in a system according to claim 1.

25. A computer program that can be loaded onto a server connected through a network to a client computer, so that the server running the computer program constitutes a system controller in a system according to claim 22.

26. A computer program that can be loaded onto a computer connected through a network to a server, so that the computer running the computer program constitutes a system controller in a system according to claim 22.

* * * * *